FIG_4A

United States Patent Office 2,924,324
Patented Feb. 9, 1960

2,924,324
DEMAND ACTUATED CONVEYOR SYSTEM

Alfred D. Benson, Farmington, Herman Schlottmann, Detroit, and Russell Hector, Novi Township, Mich., assignors to Control Design and Fabricate Inc., Farmington, Mich., a corporation of Michigan Application December 30, 1958, Serial No. 783,806

25 Claims. (Cl. 198—78)

This invention relates to an automatic demand actuated conveyor system for distributing deliveries from one or more supply stations to a plurality of delivery stations in response to demand signals at the delivery stations.

The embodiment disclosed has been adapted for and employed in United State Government post offices in distributing trays of mail for sorting purposes. The conveyor system in this instance distributes trays of mail, as required, to a series of aisles along which sorters are stationed. Depending on the time of day and the general mail load, a larger or smaller number of sorters may be employed in each aisle and certain aisles may from time to time be entirely shut down.

To meet these requirements, the system employs a supply station where trays of incoming mail are stacked in line against a retractable stop on a feed conveyor extending from the end of the supply station past the ends of the aisles, and branch or "side ledge" conveyors extend from the feed conveyor to the sorting aisles.

Pneumatically operated diverting arms are adapted when lowered to intercept trays of mail traveling on the feed conveyor which have been released from the supply station in response to a demand signal. Each delivery station for a sorting aisle is provided with a selector switch which may be manually set for different numbers of trays, for example, five, ten or fifteen, depending on the number of sorters employed at a given time, as well as a manually operated push button for initiating a demand call for the pre-selected number of trays. Such push button may be actuated each time a need for trays arises or may be locked in an actuated position for "constant call."

When the demand button is pushed for a pre-selected number of trays at a given aisle, a corresponding number of trays is released from the supply station and the corresponding diverter arm is lowered to intercept and guide such trays onto the branch side ledge conveyor, after completion of which delivery the diverter arm is raised.

In order to provide for equalized distribution to all demanding sorting aisle delivery stations in operation, a master control is provided which assures a complete cycle of deliveries to the various demanding delivery stations before repeating a delivery to any one of them. This is preferably accomplished through the use of a stepping relay having a number of steps at least equal to the number of delivery stations, the contacts at each successive step corresponding to successive delivery stations in the order of their spacing from the supply station. Commercially available rotary stepping switches are adaptable to this purpose. This unit is employed as a signal seeking device progression of which is initiated by a demand signal at any of the delivery stations. When the demand signal is found by the stepping relay reaching a corresponding contact, further stepping is interrupted until the pre-selected, predetermined number of trays has been released from the supply station by a circuit initially established through closed stepping relay contacts. The stepping relay is then free to be re-activated to seek, find and stop at further demand signals from delivery stations down stream of the previous demand signal for each of which the stepping cycle is again interrupted until the required number of trays has been released. As each delivery is completed, the corresponding diverter arm is raised permitting any additional trains of trays to pass until, after the last of the demand signals in the order of spacing from the supply station has been satisfied and all diverter arms are up, the stepping relay will be free to answer a new cycle of calls. It will be seen that with this system, it is unnecessary to await completion of delivery to any given station before starting a delivery to a subsequent station. In fact, if all demand buttons are locked in "constant call" position, the trains of trays will be continually released, with only a short gap between successive trains providing time for raising the successive diverter arms after each delivery is completed.

The principal mechanical components employed in this embodiment include feed and side ledge roller conveyors selectively power driven as by belts extending along the lower level of the rollers, a pneumatically actuated retractable stop mechanism interposed between a pair of rollers at the supply station and a pneumatically actuated diverter arm positioned above the feed conveyor at the intersection of each side ledge conveyor. Two alternative control circuits are disclosed. In the first an initial demand call at any delivery station energizes a memory relay and starts a signal seeking stepping relay. When the demand signal is found, a corresponding diverter arm is lowered and delivery released from the supply station. A limit switch actuated by released trays at the supply station energizes another stepping relay which counts the trays and, when a number corresponding to the delivery station selector control setting has been reached, a circuit is completed indicating that the delivery has been fully released. This re-energizes the stepping circuit for the signal seeking stepping relay if one or more further demand signals have been established and, upon finding the next demand signal in order of spacing from the supply station, the stepping circuit is again interrupted, the corresponding diverter arm lowered and the release of a second train of trays effected corresponding in number to the pre-selection for such delivery station, whereupon the stepping relay continues to find further demand signals and initiate the release of trays until all required deliveries for a given cycle of demand calls have been released from the supply station. The signal seeking stepping relay thereupon awaits the completion of such deliveries and raising of all diverter arms before responding to a new cycle of calls. After each delivery arrives at a delivery station, sensed by a limit switch at the delivery station actuated by passing trays, together with a brief time delay after the last tray has passed, the diverter arm is raised to a by-passing position which permits the following deilvery to proceed to its delivery station.

In the second control system as in the first, an initial demand signal starts a signal seeking stepping relay, finding the demand signal starts release of the delivery, completion of the release re-starts the stepping relay if another demand signal has been made, and otherwise the stepping relay waits at the last demand signal position until a new demand signal arises. The main operating distinction lies in the fact that a diverter arm is not lowered at the time a corresponding demand signal is found but instead is lowered in response to actuation of a limit switch by the initial tray of a train approaching such delivery station.

In order to avoid crowding and possible interference between the trays while being diverted from the feed conveyor to a side ledge conveyor through action of a diverter arm, it has been found desirable to provide a small predetermined space between successive trays of a delivery train. Such spacing is accomplished by momentarily raising the stop at the supply station after each tray passes. While the specific construction of the preferred stop mechanism employed for this purpose forms the subject matter of another patent application and is only schematically illustrated herein, it may be understood generally that the stop is constructed so that it may be retracted to a non-blocking position by an air cylinder controlled through a solenoid valve and may also be held depressed by the weight of a tray against a spring return action even when the air cylinder is returned to its normal position. The stop is also constructed so that when the rear edge of a tray passes over it after it has been released for blocking position, the spring action will cause the stop to raise and intercept the next succeeding tray even when following at the closest possible position. Tray engagement of a limit switch positioned less than a tray's length beyond the stop is employed to actuate the solenoid valve and air cylinder to return to their normal positions so that the stop is free to rise under spring tension immediately behind the trailing edge of each tray and release of the limit switch by the passing trays is employed to reactuate the valve and air cylinder to a stop retract position until the full delivery train has been released. The same limit switch is employed in the circuit for actuating the counter stepping relay.

An additional spacing between successive delivery trains has been found desirable in order to provide sufficient time for raising the diverter arm for a preceding delivery so that non-interference with the passing of the succeeding delivery train is assured. For this purpose, upon completion of the release of a given delivery train, a brief time delay is provided before permitting the signal seeking stepping circuit to continue its hunting cycle.

Another limit switch senses the presence of a tray waiting against the stop at the supply station which is employed to prevent the beginning of a stepping cycle if no tray is present. In the event an insufficient number of trays is present to complete a given delivery order, a time delay circuit is employed to produce a signal equivalent to completion of the count so that a partial delivery will be treated as a completed delivery for purposes of cycling the control. From the above brief description it will be understood that the present invention is primarily directed to provide a demand actuated conveyor system wherein deliveries are released from a supply station to any of a plurality of delivery stations upon demand, wherein successive deliveries may be released continually without waiting for completion of preceding deliveries, and wherein equalized distribution is assured by preventing any repeat deliveries to a given delivery station until each demand signal of a given cycle has been satisfied.

Another object is to adapted the system to multiple supply stations, for example, to handle incoming mail from several conveyor lines with provision for alternating deliveries from the respective incoming lines and giving preference to any overloaded conveyor line, or as a further example, to provide for selective demand as to different classes of mail coming from several sources along different conveyor lines.

A complete understanding of the present invention and its objects may be had from the following more detailed description with reference to the drawings wherein.

Figure 1:
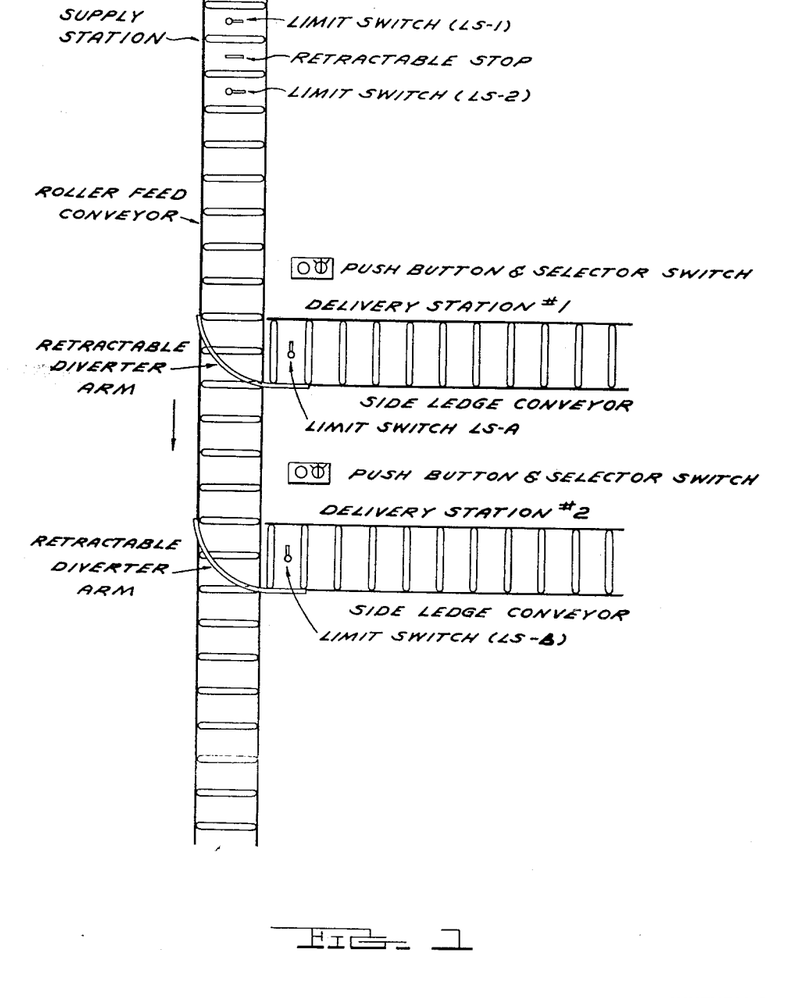
Figure 1 is a schematic plan view of an abbreviated conveyor layout illustrating the mechanical conveyor and control elements employed.

Referring to Figure 1, it will be seen that a Roller Feed Conveyor leads from a Supply Station to a plurality of Delivery Stations, only two of which are illustrated. The Feed Conveyor and Side Ledge Conveyors are each selectively powered by motor driven belts (not shown) on the lower surface of the rollers, and mail trays released by the Retractable Stop at the Supply Station are selectively diverted to any of the Delivery Stations by Retractable Diverter Arms intercepting their path on the Feed Conveyor. All of the controls are ultimately directed to actuation of the Retractable Stop and appropriate Diverter Arms to effect selective delivery to the respective Delivery Stations upon demand indicated by Push Button and Selector Switch settings.

Figure 2A:
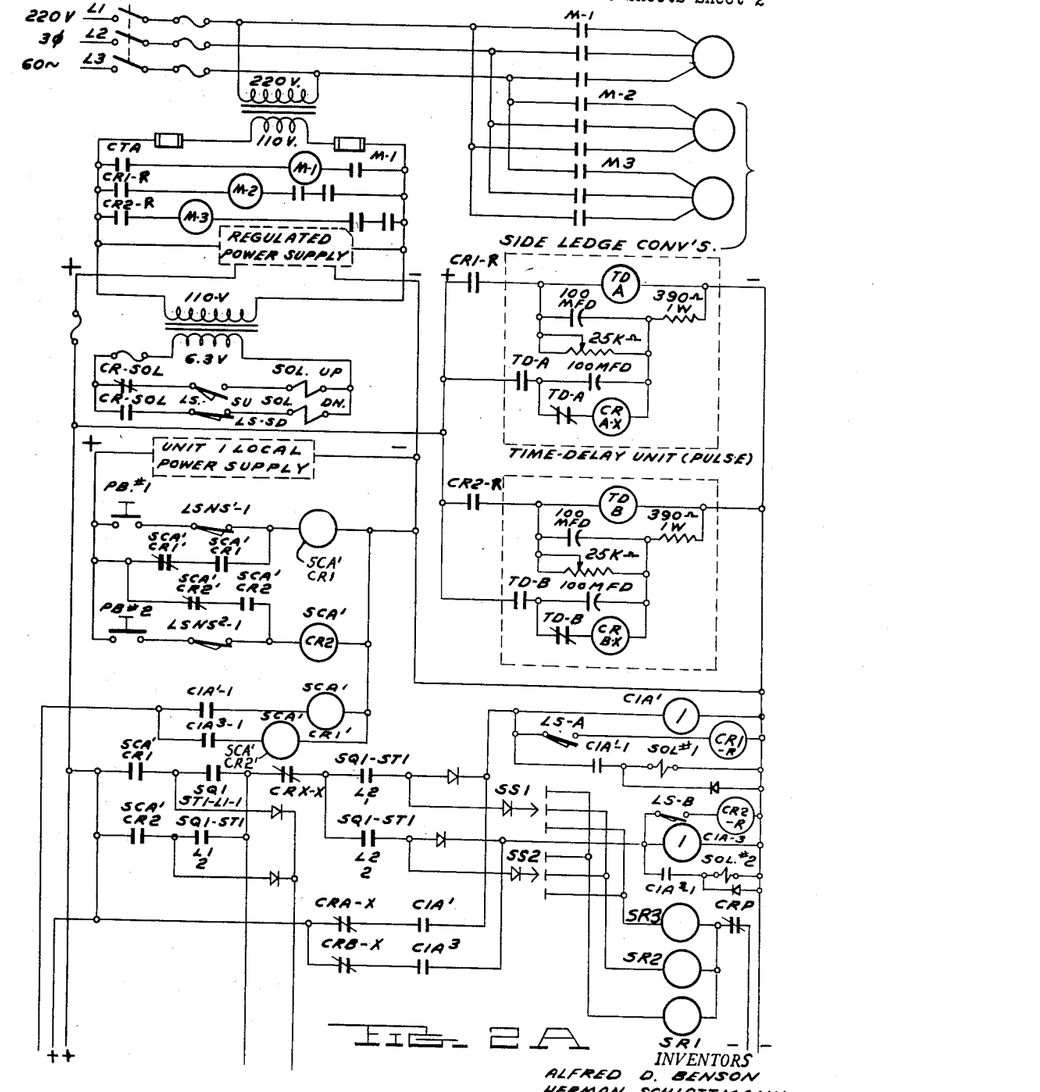
Figure 2A is a schematic wiring diagram of the electrical control circuit employed in actuating the mechanical components illustrated in Figure 1.
Figure 2B:
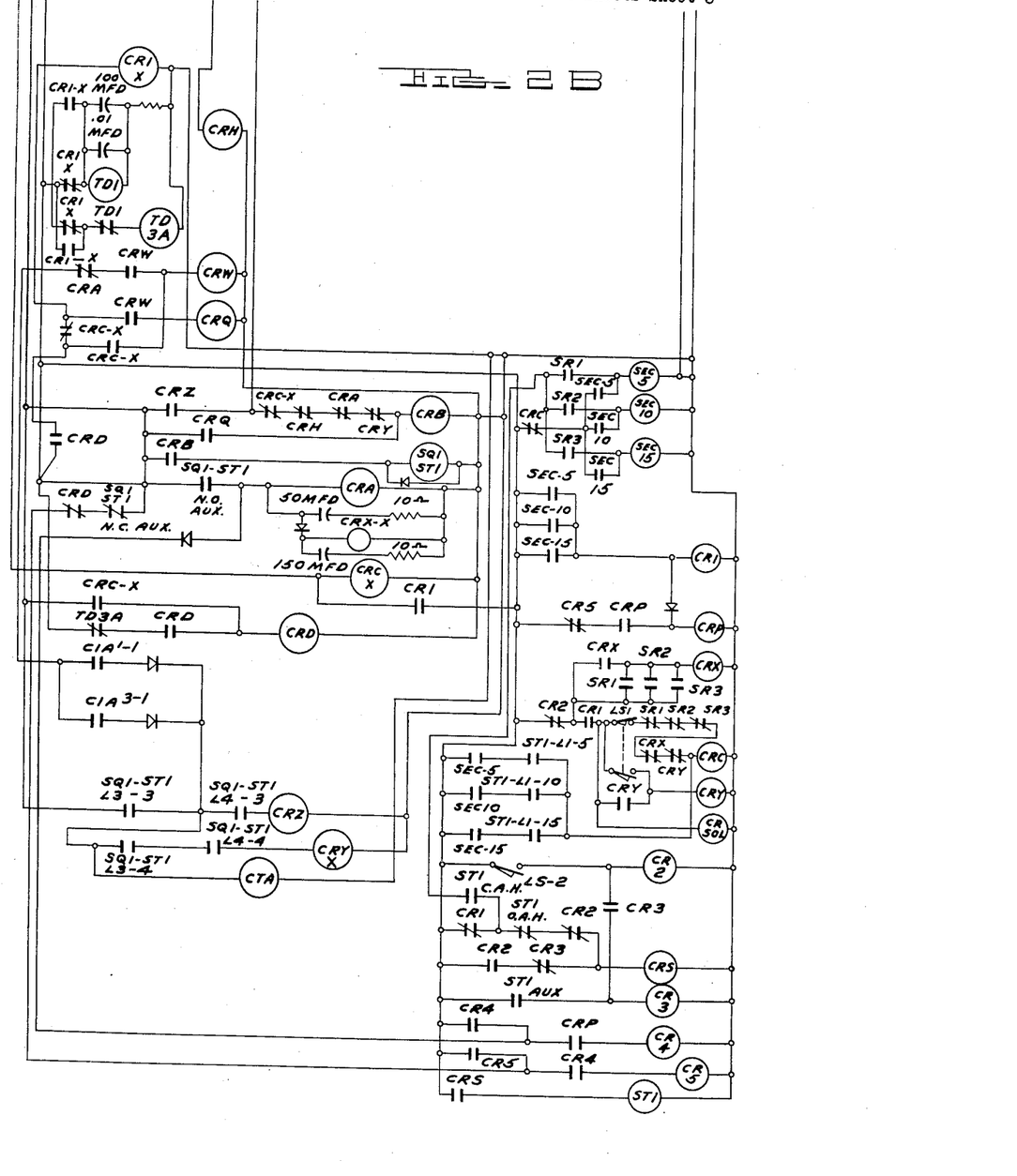
Figure 2B is a continuation of the control circuit shown in Figure 2A.
Figure 3:
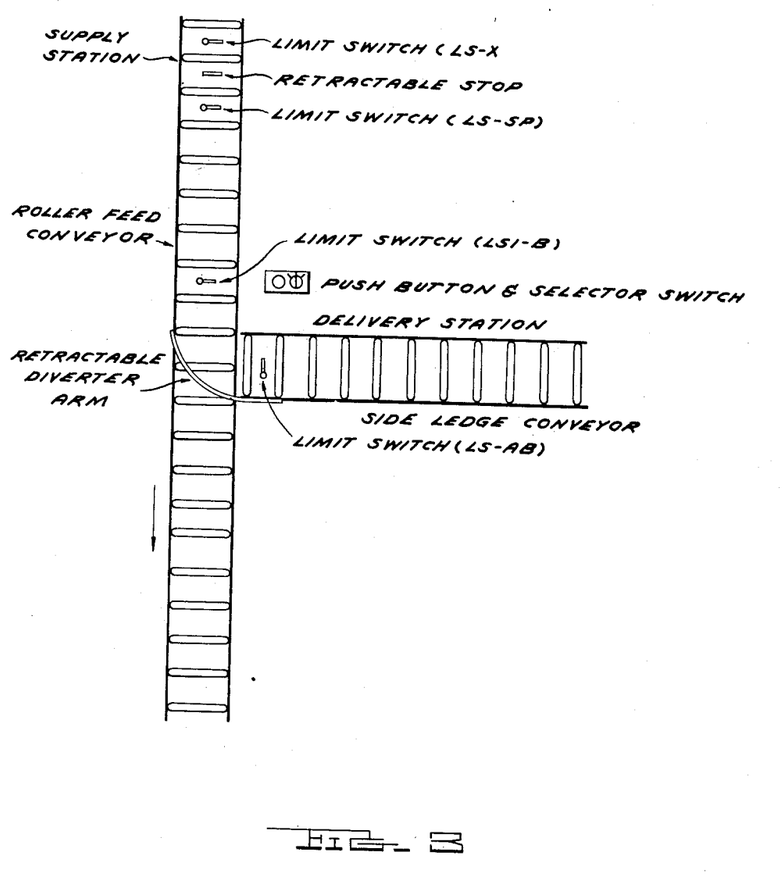
Figure 3 is a schematic plan view of a modified conveyor layout adapted to an alternative system of control.

With reference to Figures 2A and 2B, the electrical controls employed include SOL.UP and SOL.DN. coils for actuating the Retractable Stop solenoid valve and air cylinder (not shown) which are adapted to retract the Stop to a tray releasing position whenever the SOL.DN. coil is energized and to permit spring return of the Stop to a tray blocking position when the SOL.UP coil is energized and the rear edge of a tray passes off the Stop. Limit switches LS–SU and LS–SD open the coil energizing circuits at the end of the air cylinder travel. Diverter Arms are normally in an up by-passing position and are selectively moved down to a diverting position by a spring return solenoid valve and air cylinder (not shown) actuated to a down position when respective SOL #1 and SOL #2 coils are energized. The signal seeking stepping relay is actuated one step by the successive energizing and de-energizing of stepper SQ1—ST1 while the stepping relay for counting the number of trays released from the supply station is actuated one step by the successive energizing and de-energizing of stepper ST1.

A number of spring return relays are employed having normally open and/or normally closed contacts reversed when the relays are energized. Before explaining the operation of the control circuit in detail, the general function of the various relays will be briefly stated. The SCA'—CR1 and SCA'—CR2 relays serve as memory relays to hold the demand signals for the respective delivery stations until found by the signal seeking stepping relay; the SCA'—CR1' and SCA'—CR2' relays serve to open the respective memory relay circuits when the demand signal is found; the CRA and CRB relays serve to control the signal seeking stepper SQ1—ST1; the CRH relay initially stops the signal seeking stepping relay when a demand signal is found; the CRX—X relay momentarily blocks the CIA$^1$–1 energizing circuit when a demand signal is found; the CIA$^1$–1 and CIA$^3$–1 relays serve in each case to bring the corresponding diverter arm down, release the corresponding memory relay, hold the demand signal until the delivery is completed, and block re-cycling of the signal seeking stepping relay until all deliveries of a given cycle are completed and the diverter arms are up; relays SR1, 2 and 3 initially identify the quantity required depending on the setting of the selector switch at the delivery station; when a demand signal is found, relays SEC–5, 10 and 15 hold the corresponding quantity required signal until a corresponding quantity has been released; relay CR1 holds the signal seeking stepping relay until the required delivery has been released from the supply station; relays CRP, CR4, CR5, CR1–X, TD1 and TD3A are employed in providing a time delay and desired spacing between successive delivery trains; relay CRX prevents any release action until at least one tray is at the supply station; relay CRC releases quantity relay SEC–5, 10 or 15 when a delivery is fully released from the supply station; relay CRY holds the demand call if there is a tray at the supply station until such tray is released; relays CR—SOL and CR2 control the Stop solenoid at the supply station; relays CRS and CR3 control the counting stepping relay ST1; relays CRW and CRQ re-start the signal seeking stepping relay after a delivery has been released; line contactor M-1 controls the motor for the feed conveyor; line contactor M-2 controls the motor for the side ledge conveyor at Delivery Station #1; line contactor M-3 controls the motor for the side ledge conveyor at Delivery Station #2; relay CR1-R controls the line contactor M-2; relay CR2-R controls the line contactor M-3; relay CTA controls the line contactor M-1; relay CRY—X delays a new cycle until all deliveries are completed; and relay CRZ drives the signal seeking stepping relay after it has passed the last delivery station.

Proceeding now to a detailed description of the control cycle, let it be assumed that trays have been accumulated at the supply station, all diverter arms are up and all conveyors stopped when an initial call is made at Delivery Station #1 with the Selector Switch set for ten trays by manually pressing push button PB #1. A circuit is completed through push button PB #1 and limit switch LSNS-1 energizing memory relay SCA'—CR1 which in turn closes a holding circuit through the normally closed contact of relay SCA'—CR1' and the now closed contact SCA'—CR1 and also closes a circuit through the now closed contact SCA'—CR1 and the normally closed contacts CRC—X, CRH, CRA and CRY (Figure 2B) energizing relay CRB which energizes the signal seeking stepper SQ1—ST1 which momentarily energizes relay CRA opening the circuit to relay CRB and stepper SQ1—ST1 causing the stepping relay to take one step at which position the SQ1-ST1-L1-1 contact (Figure 2A) closes establishing a circuit to relay CRH which opens the circuit to relay CRB thereby holding the signal seeking stepping relay from taking any further steps.

When momentary time delay relay CRX—X, initially energized when stepper SQ1—ST1 was energized, times out, a circuit is completed through contacts SCA'—CR1, SQ1-ST1-L1-1, CRX—X, and SQ1-ST1-L2-1 to relay CIA'-1 which in turn closes circuits through contacts CIA'-1 to the diverter arms down SOL #1, the relay CTA which energizes motor contactor M-1 starting the feed conveyor motor, the relay SCA'—CR1' dropping out memory relay SCA'—CR1, and also closes a holding circuit for relay CIA'-1 through the normally closed contact of relay CRA—X. At the same time, a circuit is established through the Selector Switch SS1 energizing relay SR2 which in turn energizes the quantity control relay SEC-10 by a circuit passing through the ST1 C.A.H. (closed at home) contact of the counter stepping relay ST1. Upon initially energizing the relay SEC-10, a holding circuit is established through the normally closed contact of relay CRC and an energizing circuit is established for relay CR1 as well as a one way rectifier circuit for energizing relay CRP which provides its own holding circuit through the normally closed contact of relay CR5. The energizing of relay CR1 establishes a circuit passing through contacts CR2, CR1, and LS1 energizing relay CRY, since a tray at the supply station will have actuated limit switch LS1, and a circuit will also be established energizing relay CR—SOL. The relay CR—SOL in turn establishes a circuit through the solenoid coil SOL.DN. causing the spacer Stop at the Supply Station to be retracted to a tray releasing position. Limit switch LS—SU closes with the initial Stop retraction stroke and limit switch LS—SD opens at the end of such retraction stroke.

As the first tray released thereby moves into engagement with limit switch LS2, it closes a circuit to relay CR2 which in turn opens the circuit to relay CR—SOL which closes the circuit to the solenoid coil SOL.UP thereby permitting the Stop to return to tray blocking position as soon as the rear edge of the first tray has passed. The energizing of relay CR2 also closes a circuit to relay CRS which energizes the counting stepper ST1. This energizes relay CR3 which opens a circuit to relay CRS de-energizing the stepper ST1 causing the counter to take one step. When the rear edge of the first tray passes off limit switch LS2 de-energizing relay CR2, a circuit is again established to the relay CR—SOL causing the Stop to be retracted releasing a second tray spaced from the first by a distance established by the spacing of limit switch LS2 from the Stop.

When the second tray reaches limit switch LS2, relay CR2 will again be energized closing a circuit to relay CRS again energizing the stepper ST1 and relay CR3 which opens the circuit to relay CRS de-energizing the stepper ST1 thereby causing it to take another counting step. This sequence will repeat with the Stop operating to release a series of spaced trays until the counting stepping relay reaches the tenth position at which time a circuit is closed through the contacts SEC-10 and ST1-L1-10 to energize the relay CRC which opens the circuit to the relay SEC-10 dropping out relay CR1. A circuit is thereupon established energizing stepper control relay CRS through the normally closed CR1 and ST1 O.A.H. (open at home) contacts which will drive the stepping relay to home position. Such circuit will successively energize relay CRS which energizes stepper ST1 which energizes relay CR3 which energizes relay CR2 which opens the circuit to relay CRS de-energizing stepper ST1 permitting a further step to be taken and opening the circuit to relay CR3 which de-energizes relay CR2 again closing the circuit to relay CRS, such sequence continuing until the stepper reaches a home position at which the normally closed ST1 O.A.H. contact opens.

Prior to the time relay CR1 drops out, it will have energized relay CRC—X which in turn will have energized relay CRD, the latter establishing its own holding circuit through the normally closed contact TD3A. Accordingly, when relay CR1 drops out, the de-energizing of relay CRC—X will establish a circuit through the now closed contacts of relay CRD and relay CRC—X to the relay CR1—X which in turn opens the previous energizing circuit for time delay relay TD1. This starts the TD1 timing circuit which establishes a desired spacing between successive orders or trains of trays. At the same time, an energizing circuit is established to relay CRQ through the CRW contact which was previously closed when CRW was energized (when both relays CRD and CRC—X were simultaneously energized) and held by the normally closed CRA contact. Relay CRQ thereupon establishes an auxiliary energizing circuit to relay CRB which energizes the stepper SQ1—ST1 which in turn closes a normally open auxiliary contact for energizing relays CRA and CR4 which latter circuit is held by the now closed CR4 and CRP contacts. When relay CRA is energized, the holding circuit to relay CRW is opened dropping out relays CRQ, CRB and stepper SQ1—ST1 thereby causing the stepping relay to move one step from position one. In the absence of further demand signals, the stepping relay will remain at its second step position or, in the event another demand signal energizes the main circuit to relay CRB, the stepping relay will continue to hunt for such new demand signal through successive energizing and de-energizing of relays CRB, SQ1—ST1 and CRA until finding such signal again energizes relay CRH thereby interrupting the stepping circuit at the new demand position.

Returning to consideration of the time delay circuit, when the timer relay TD1 times out a pulse circuit will be established through energized relay contact CR1—X and normally closed contact TD1 to relay TD3A which will open the holding circuit for relay CRD thereby closing a circuit to relay CR5 which opens the holding circuit for relay CRP permitting a new release signal to be established through selector relay SR1, SR2, or SR3 in the event a new demand signal has been found by the stepping relay. This would initiate a new release cycle with a spacing between trains established by the time delay relay TD1.

Considering now the first train of trays released in response to the initial demand signal, as they proceed along the Feed Conveyor the first tray will be intercepted by the Diverter Arm at Delivery Station #1 which had been lowered through the energizing of relay CIA′-1. When the first tray engages limit switch LS—A at the head of the Side Ledge Conveyor, it will energize relay CR1—R which in turn energizes line contactor M-2 for the corresponding Side Ledge Conveyor motor as well as energizing time delay relay TD—A which has a timing period set to exceed the spacing between individual trays of the same delivery but to sense through timing out the relatively larger spacing between successive trains of trays. Accordingly, when the rear edge of the first tray passes off limit switch LS—A relay CR1—R becomes de-energized stopping the Side Ledge Conveyor motor and starting the timing cycle of relay TD—A. Before such relay times out the second tray will engage limit switch LS—A re-starting the Side Ledge Conveyor motor and re-energizing the condenser holding circuit for time delay relay TD—A. By thus intermittently stopping the Side Ledge Conveyor motor, the spacing between successive trays is closed up on the Side Ledge Conveyor. When the last tray of a train passes off limit switch LS—A and timer relay TD—A times out, a pulse circuit is established energizing relay CRA—X which opens the holding circuit to relay CIA′-1 which in turn de-energizes the spring return diverter arm down SOL #1 circuit causing the Diverter Arm to be raised to its normal by-passing position, thereby completing the delivery cycle for such Delivery Station.

In the event the last delivery of a given cycle of the signal seeking stepping relay has been released but not completed and a demand signal is placed which requires a new cycle of the stepping relay, a circuit is provided which will cause the stepping relay to step to its last position and wait there until the last delivery has been completed. Such circuit is provided by relay CRZ (which drives the stepping relay through any intervening steps not used for Delivery Stations) and upon reaching the last step relay CRY—X is energized by a circuit passing through any closed CIA contact indicating an uncompleted delivery. This opens the relay CRB energizing circuit until such delivery is completed and the CRY—X relay drops out thereby permitting the stepping relay to start a new cycle.

It should be noted that in the event of an insufficient number of trays at the Delivery Station to fill a given order, the relay CRC will be energized by a circuit passing through limit switch LS1 thereby dropping out relay CR1 the same as if the full number had been released. Since the Diverter Arm responds to a time delay such partial order will also be effective to raise the Diverter Arm.

Figure 4A:
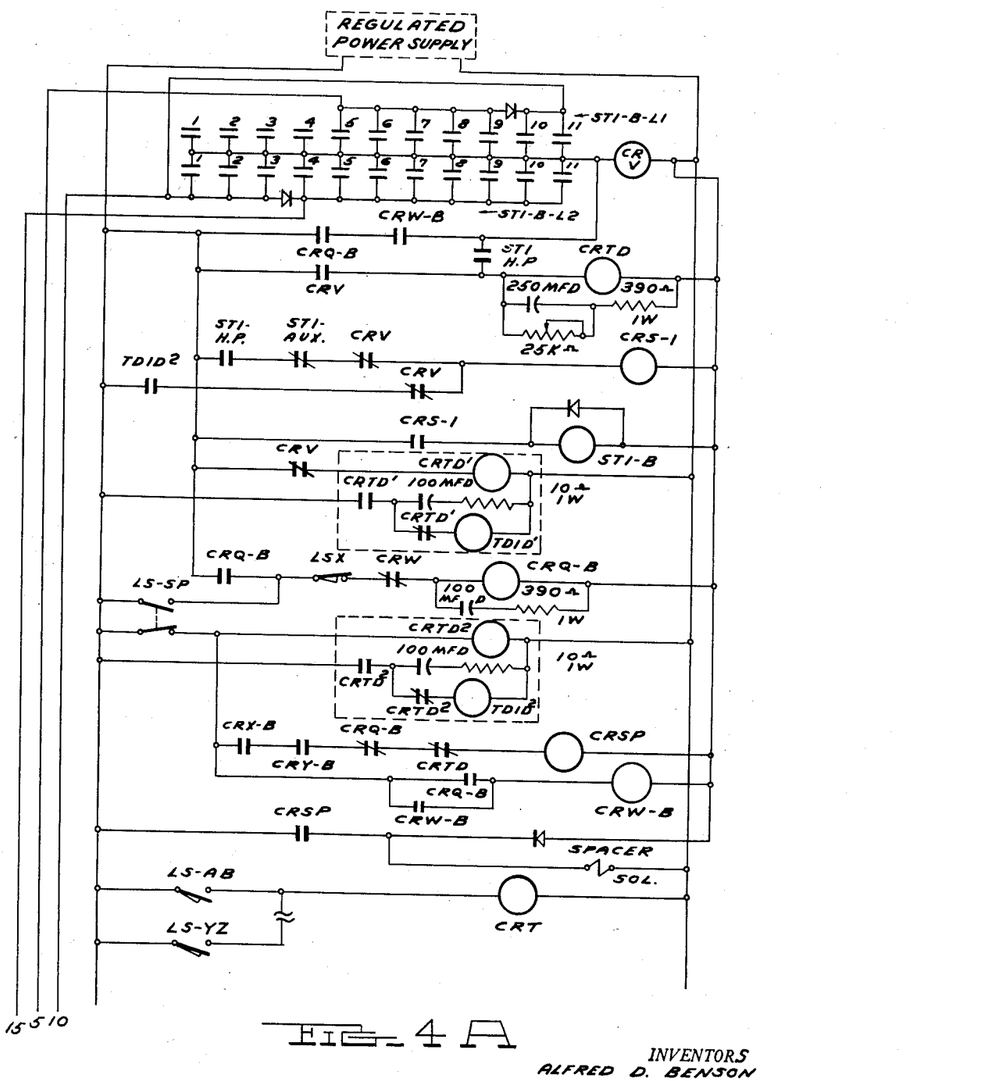
Figure 4A is a schematic wiring diagram of the electrical control circuit for the conveyor layout illustrated in Fig. 3.
Figure 4B:
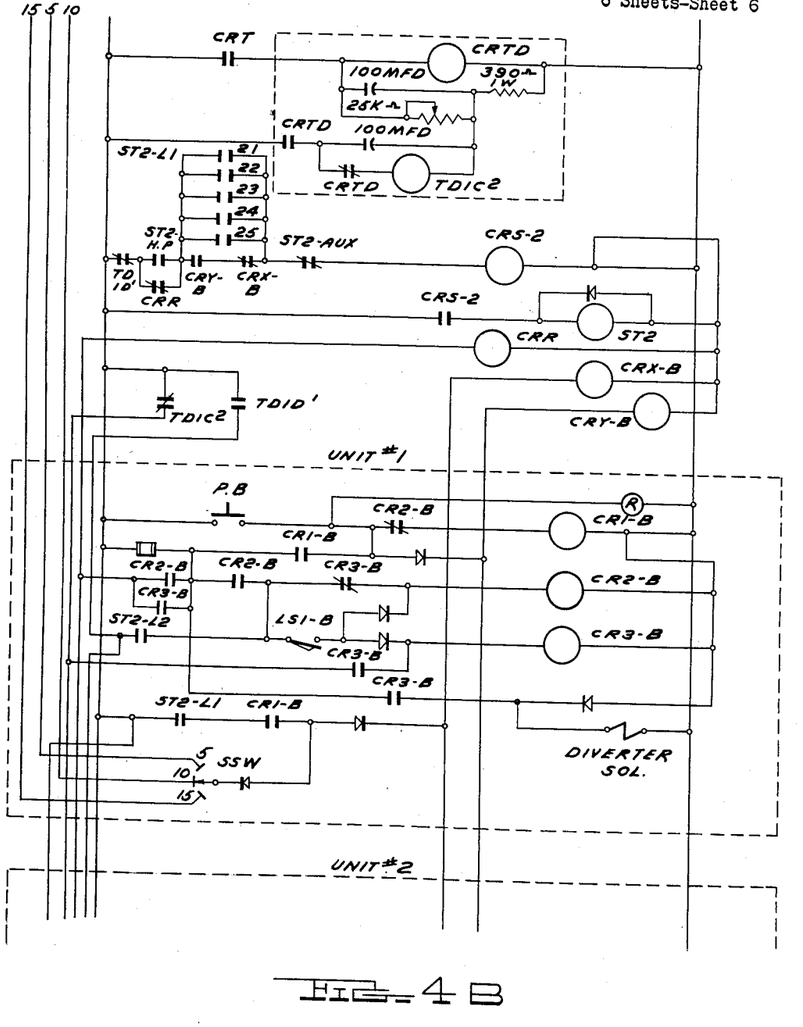
Fig. 4B is a continuation of the electrical control circuit shown in Figure 4A.

Referring now to the alternative control circuit shown on Figures 4A and 4B a P.B. demand signal at any of the delivery stations, as exemplified by Unit #1, will energize the memory relay CR1—B which is held through a normally closed CR2—B contact. This energizes relay CRY—B which starts a signal seeking stepping relay circuit by first energizing relay CRS-2 which energizes stepper ST2 which opens the circuit to CRS-2 de-energizing stepper ST2 thereby causing one signal seeking step to be taken, such stepping continuing until a demand signal is found closing a circuit to relay CRX—B (passing through stepper contact ST2—L1 and relay contact CR1—B) thereby holding open the stepping circuit to relay CRS-2. The Feed Conveyor motor is started by a circuit, not shown, established by energized relay CRX—B and maintained when relay CRR is energized. A circuit is also now established through the spacer relay CRSP which energizes a spring return Spacer SOL. coil for retracting the spacer Stop thereby releasing the first tray.

When such tray actuates limit switch LS—SP the circuit to relay CRSP is opened causing the spacer Stop to be released. Limit switch LS—SP also opens an energizing circuit for relay CRTD² establishing a pulse circuit for relay TDID² momentarily closing relay CRS-1 and energizing stepper ST1—B for a count stepping relay which takes one step at the end of each pulse from relay TDID². The spacer Stop comes up behind the first tray holding a second tray until the first has passed off of the spacing limit switch LS—SP whereupon the circuit for retracting the Stop is again established and the tray release and count continue until a circuit depending upon the position of selector switch SSW is established through the count stepping relay energizing relay CRV. It will be noted that such circuit is established through contacts ST2—L1 of the signal seeking stepping relay, and the selector switch SSW of the delivery station as well as contacts ST1—B—L1 and L2 of the count stepping relay. The contacts of the count stepping relay are shown in two banks of eleven contacts each, the contacts of the first bank ST1—B—L1 being successively closed and then the contacts of the second bank ST1—B—L2 with progressive stepping. When relay CRV is energized, it opens a circuit to relay CRTD1 establishing a pulse circuit for relay TDID1 which in turn momentarily energizes relay CR2—B dropping out memory relay CR1—B and opening the circuit to relay CRX—B. If another call continues to energize relay CRY—B the signal seeking stepper will now hunt for such call being stopped again when relay CRX—B is again energized by finding the demand signal. The count stepping relay is driven home by the holding circuit for relay CRV and energizing circuit for relay CRS-1 passing through the ST1—HP contacts which are closed except at home position, the relay CRS-1 energizing stepper ST1—B which opens the ST1—AUX contact de-energizing relay CRS-1 etc. until the stepping relay reaches home position which opens the stepping circuit and de-energizes relay CRV. When time delay relay CRTD times out a further circuit may be established to the spacer relay CRSP in response to finding a further demand call.

As a train of trays approaches the demanding delivery station limit switch LS1—B in advance of the delivery station is contacted closing a circuit to relay CR3—B which energizes a spring return solenoid for the Diverter Arm causing the arm to drop and intercept the order. When the first tray contacts the limit switch LS—AB it will energize relay CRT which in turn energizes time delay relay CRTD and when the last tray of the delivery releases limit switch LS—AB de-energizing relay CRT and time delay relay CRTD times out a pulse circuit is established through relay TDIC2 which opens the holding circuit for relay CR3—B thereby permitting the diverter arm to raise.

If there is an insufficient number of trays to complete an order limit switch LSX will close energizing relay CRQ—B and when the last tray passes limit switch LS—SP energizing relay CRW—B, a circuit will be established to relay CRV the same as if the count were completed.

It will be seen that the conveyor system may be expanded to any number of delivery stations for each of which a duplicate of the circuit shown in Unit #1 will be employed. A limit switch corresponding to limit switch LS1—B in advance of each delivery station will provide circuits for lowering the respective diverter arms in the order of demand signals found by the signal seeking stepping relay and a limit switch corresponding to LS—AB at each of the delivery stations will provide parallel circuits for energizing relay CRT to effect successive raising of the diverter arms after deliveries have been completed. When the signal seeking stepping relay has answered the last demand call of a given cycle and has received a demand call for a new cycle, the stepping relay will advance through any surplus contacts such as ST2—L1 21—25 to a home position at which the opening of the ST2—HP contact will interrupt the stepping circuit until relay CRR becomes de-energized by the completion of all deliveries of the previous cycle.

While a specific conveyor system and two alternative control circuits have been described above in detail, it will be understood that numerous modifications may be resorted to without departing from the scope of this invention as defined in the following claims.

We claim:

1. A conveyor system comprising a supply station, a plurality of delivery stations successively spaced from said supply station, conveyor means operable along a path leading from said supply station successively toward said respective delivery stations, selectively operable starting means for starting successive deliveries from said supply station on said conveyor means toward said delivery stations, selectively operable diverting means for diverting deliveries on said conveyor means to respective individual delivery stations, selectively independently and simultaneously operable demand signal means for indicating delivery requirements at respective individual delivery stations, and control means for said starting means and diverting means responsive to said demand signal means including sensing means for progressive sensing demand signals successively in the order of spacing of corresponding delivery stations from said supply station, and means responsive to said sensing means for operating said starting means and diverting means to convey deliveries from said supply station to said respective demanding delivery stations in the order of their spacing from said supply station.

2. A conveyor system as set forth in claim 1 wherein said selectively operable demand signal means comprise manually operable electrical contact means for respective delivery stations and relay means for storing demand signals until found by said sensing means.

3. A conveyor system as set forth in claim 1 wherein said selectively operable demand signal means comprise manually operable electrical contact means for respective delivery stations capable of being locked in constant call position for initiating repeated deliveries in successive cycles.

4. A conveyor system as set forth in claim 1 wherein said selectively operable demand signal means comprise manually operable electrical contact means for respective delivery stations with relay means for storing each demand signal until found by said sensing means, and alternate means for locking said contact means in a constant call position for effecting repeated deliveries in successive cycles.

5. A conveyor system as set forth in claim 1 including manually operable quantity selection means for each delivery station, and means responsive thereto in combination with finding a demand signal for starting a corresponding quantity when the demand signal is found.

6. A conveyor system as set forth in claim 1 including variable delivery selection means for each delivery station and means responsive thereto in combination with said sensing means for starting a corresponding delivery when said demand signal is found by said sensing means.

7. A conveyor system as set forth in claim 1 wherein said sensing means comprises a stepping relay having a number of successive electrical contact circuits at least equal and corresponding to successive delivery stations.

8. A conveyor system as set forth in claim 7 including means responsive to any demand signal for initiating a signal seeking cycle of said stepping relay.

9. A conveyor system as set forth in claim 8 including means responsive to sensing a particular demand signal for interrupting the further seeking of said stepping relay.

10. A conveyor system as set forth in claim 8 including means responsive to sensing a particular demand signal for interrupting the further seeking of said stepping relay and initiating the release of a corresponding delivery from said supply station.

11. A conveyor system as set forth in claim 10 including means responsive to the completion of said release from said supply station for permitting said stepping relay to seek any further spaced delivery station demand signal.

12. A conveyor system as set forth in claim 11 including means for spacing successive deliveries released from said supply station in response to successive demand signals found by said stepping relay.

13. A conveyor system as set forth in claim 1 including limit switch means responsive to the approach of a delivery on said conveyor means toward a corresponding delivery station for initiating the operation of corresponding diverter means.

14. A conveyor system as set forth in claim 1 including means responsive to sensing a particular demand signal for initiating the operation of corresponding diverter means.

15. A conveyor system as set forth in claim 1 including means responsive to sensing a particular demand signal for initiating the operation of corresponding diverter means and for starting said conveyor means.

16. A conveyor system as set forth in claim 1 including manually operable quantity selection means for each delivery station, and means responsive thereto in combination with finding a demand signal for starting a corresponding quantity when the demand signal is found, said starting means including a quantity count stepping relay control responsive to the position of said quantity selector.

17. A conveyor system as set forth in claim 1 including manually operable quantity selection means for each delivery station, and means responsive thereto in combination with finding a demand signal for starting a corresponding quantity when the demand signal is found, said starting means including a quantity count stepping relay control responsive to the position of said quantity selector, and time delay means for spacing deliveries for successive delivery stations.

18. A conveyor system as set forth in claim 1 including means responsive to sensing a particular demand signal for initiating the operation of corresponding diverter means, and means responsive to completion of a delivery for restoring the corresponding diverting means to its normal inoperative position.

19. A conveyor system as set forth in claim 1 including limit switch means responsive to the approach of a delivery on said conveyor means toward a corresponding delivery station for initiating the operation of corresponding diverter means, and means responsive to completion of a delivery for restoring the corresponding diverting means to its normal inoperative position.

20. A conveyor system as set forth in claim 1 including means for preventing a new cycle of deliveries prior to completion of a previous cycle of deliveries.

21. A conveyor system as set forth in claim 1 including individual delivery station conveyor means selectively operable with corresponding diverter means.

22. A conveyor system as set forth in claim 1 including delivery responsive means for restoring each diverting means to its normal inoperative position, said means including a limit switch actuated while a delivery is taking place, and time delay means responsive to release of said limit switch for indicating completion of delivery.

23. A conveyor system as set forth in claim 1 including manually operable selection means for each delivery station, and means responsive thereto in combination with finding a demand signal for starting a delivery corresponding to the setting of said selection means when the demand signal is found.

24. A conveyor system comprising a supply station, a plurality of delivery stations successively spaced from said supply station, conveyor means operable along a path leading from said supply station successively toward said respective delivery stations, selectively operable starting means for starting successive deliveries from said supply station on said conveyor means toward said delivery stations, selectively operable diverting means for diverting deliveries on said conveyor means to respective individual delivery stations, selectively independently and simultaneously operable demand signal means for indicating delivery requirements at respective individual delivery stations, and control means for said starting means and diverting means responsive to said demand signal means operative to start a delivery in response to any initial demand signal, to start succeeding deliveries to further delivery stations in the order of their spacing beyond said initial delivery station in response to corresponding demand signals without waiting for completion of delivery to said initial delivery station, to activate said diverting means for said initial and further delvery stations as required to intercept corresponding deliveries, and to inactivate said diverting means for said initial and further delivery stations upon completion of each respective delivery thereto.

25. A conveyor system as set forth in claim 24 including means for spacing successive deliveries, means responsive to said spacing for sensing completion of each respective delivery.

References Cited in the file of this patent

UNITED STATES PATENTS

| | | |
|---|---|---|
| 2,728,466 | Postlewaite | Dec. 27, 1955 |
| 2,880,891 | Carroll | Apr. 7, 1959 |